United States Patent [19]

Oyama

[11] Patent Number: 4,928,214

[45] Date of Patent: May 22, 1990

[54] VEHICLE FRONT LAMP

[75] Inventor: Hiroo Oyama, Sagamihara, Japan

[73] Assignee: Stanley Electric Co., Ltd., Tokyo, Japan

[21] Appl. No.: 414,125

[22] Filed: Sep. 28, 1989

[30] Foreign Application Priority Data

May 6, 1988 [JP] Japan ................................ 63-110129

[51] Int. Cl.5 ................................................ B60Q 1/04

[52] U.S. Cl. ........................................ 362/61; 362/80; 362/346; 362/297; 362/302

[58] Field of Search .................... 362/61, 80, 341, 346, 362/347, 297, 302

[56] References Cited

U.S. PATENT DOCUMENTS

| | | | |
|---|---|---|---|
| 4,208,704 | 6/1980 | Draper | 362/61 |
| 4,680,679 | 7/1987 | Dilouya | 362/61 |
| 4,831,502 | 5/1989 | Fujino et al. | 362/297 |
| 4,841,423 | 6/1989 | Luciani | 362/61 |

FOREIGN PATENT DOCUMENTS

| | | |
|---|---|---|
| 61-63702 | 4/1986 | Japan . |
| 61-71905 | 5/1986 | Japan . |

*Primary Examiner*—Ira S. Lazarus
*Assistant Examiner*—Sue Hagarman
*Attorney, Agent, or Firm*—Frishauf, Holtz, Goodman & Woodward

[57] ABSTRACT

A vehicle front lamp includes a light source upper and lower first curved surfaces made of composite curved surfaces to reflect a light beam from a light source in the left direction and in the right direction, respectively, the upper and lower first curved surfaces being respectively mounted at higher and lower positions than the light source; and upper and lower second curved surfaces for reflecting a light beam reflected from the upper and lower first curved surfaces for making the light beam substantially parallel in the forward direction of the vehicle, the upper and lower second curved surfaces being mounted at the right and left of the light source. The composite curved surfaces of the upper first curved surface are slanted by an angle of 10 to 35 degrees so as to direct the reflected light beam downward; the composite curved surfaces of the lower first curved surface are slanted by an angle of 10 to 35 degrees so as to direct the reflected light beam upward. The upper and lower second curved surfaces are in contact relation with each other substantially along a line, and light shielding units are mounted at the right and left of the light source along the line defining the contact between the upper and lower second curved surfaces.

11 Claims, 4 Drawing Sheets

VEHICLE FRONT LAMP

BACKGROUND OF THE INVENTION

1. Field of the Invention

The present invention relates to a front lamp for vehicles such as automobiles.

2. Description of the Prior Art

Conventional vehicle front lamps are disclosed in, for example, Japanese Utility Model Laid-open Publication Nos. 61-63702 and 61-71905 assigned to the same assignee as that of this invention. In Publication No. 61-71905, there is disclosed a vehicle front lamp which comprises an upper first curved surface made of composite curved surfaces to reflect a light beam from a light source in the left direction and in the right direction, respectively, said upper first curved surface being mounted at the higher position than said light source; a lower first curved surface made of composite curved surfaces to reflect a light beam from said light source in the left direction and in the right direction, respectively, said lower first curved surface being mounted at a lower position than said light source; an upper second curved surface for reflecting a light beam reflected from said upper first curved surface by making said light beam substantially parallel in the front direction, said upper second curved surface being mounted at the right and of said light source; and a lower second curved surface for reflecting a light beam reflected from said lower first curved surface by making said light beam substantially parallel in the front direction, said lower second curved surface being mounted at the right and left of said light source.

The above conventional lamp, however, has been found not to be satisfactory in that a light beam from a light source is reflected by the second curved surfaces to generate stray light which when reflected upward becomes dazzling light, to thereby pose a problem of difficulty in designing the light distribution of a front lamp. It has long been desired to solve such a problem.

The above conventional lamp also has a disadvantage of insufficient illuminance and the like, in spite of its complicated structure.

SUMMARY OF THE INVENTION

It is therefore an object of the present invention to provide a vehicle front lamp capable of eliminating dazzling light while attaining sufficient illuminance.

The above object is achieved by the vehicle front lamp according to the present invention, which comprises: an upper first curved surface made of composite curved surfaces to reflect a light beam from a light source in the left direction and in the right direction, respectively, said upper first curved surface being mounted at a higher position than said light source; a lower first curved surface made of composite curved surfaces to reflect a light beam from said light source in the left direction and in the right direction, respectively, said lower first curved surface being mounted at a lower position than said light source; an upper second curved surface for reflecting a light beam reflected from said upper first curved surface by making said light beam substantially parallel in the front direction, said upper second curved surface being mounted at the right and left of said light source; and a lower second curved surface for reflecting a light beam reflected from said lower first curved surface by making said light beam substantially parallel in the front direction, said lower second curved surface being mounted at the right and left of said light source; wherein said composite curved surfaces of said upper first curved surface is slanted by an angle of 10 to 35 degrees so as to direct said reflected light beam downward; said composite curved surfaces of said lower first curved surface is slanted by an angle of 10 to 35 degrees so as to direct said reflected light beam upward, said upper second curved surface and said lower second curved surface are in contact relation with each other, and light shielding units are mounted at the right and left of said light source along a line defining said contact between said upper and lower second curved surfaces. The light shielding units advantageously eliminate stray light. According to a preferred embodiment, a paraboloid of revolution is formed at the central front side portion of each of said upper and lower first curved surfaces, said central front side portion being an unavailable area relative to said second curved surfaces. According to a further embodiment, a third curved surface is formed at the surface of said light shielding units facing said light source, said third curved surface reflecting a light beam from said light source in the front direction. The above paraboloid of revolution and the third curved surfaces provide sufficient illuminance.

DETAILED DESCRIPTION

Throughout this specification, the terms "front", "back", "right"and "left" are intended to be used under the conditions that a front lamp is mounted on a vehicle. Namely, the front direction is the direction of moving a vehicle forward, the back direction is the direction of moving the vehicle backward, the right direction and left direction are the right and left directions as viewed from a driver.

Figure 1:
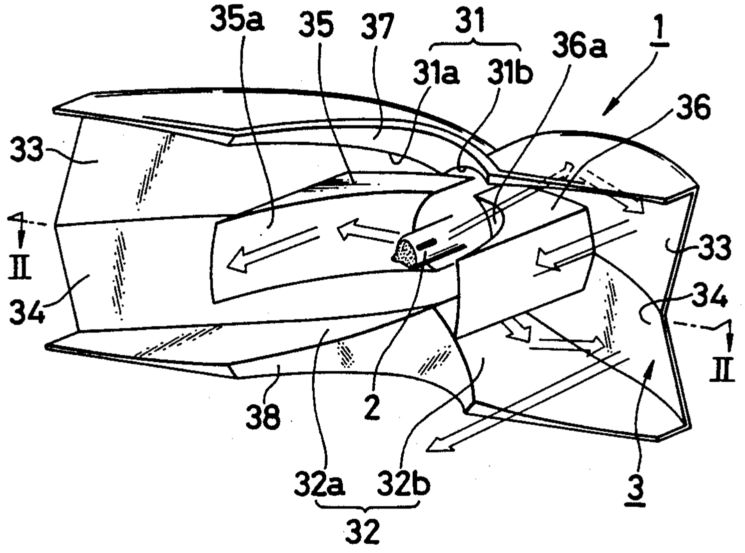
FIG. 1 is a perspective view showing an embodiment of a vehicle front lamp according to the present invention.
Figure 2:
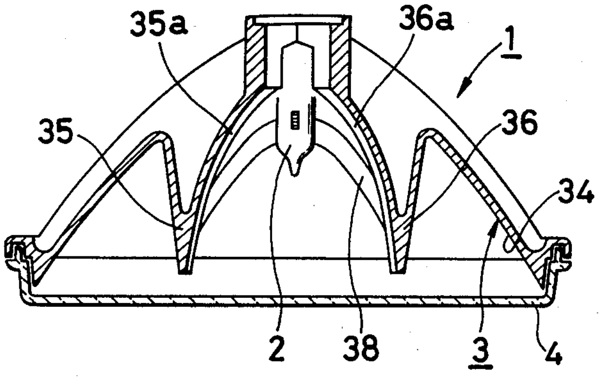
FIG. 2 is a cross section of FIG. 1 taken along line II—II in FIG. 1.
Figure 3:
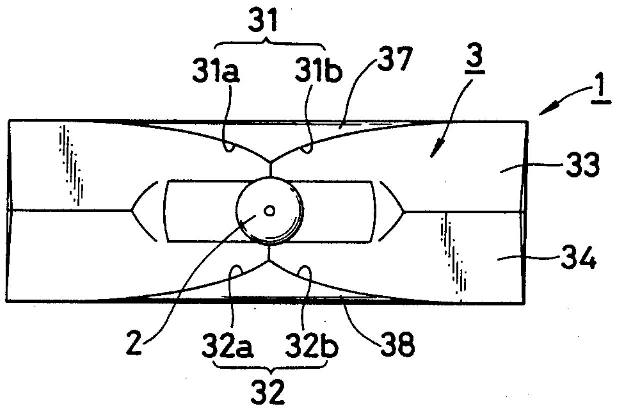
FIG. 3 is a front view of the embodiment shown in FIG. 1.

Referring now to FIGS. 1 to 3, the main part of a vehicle front lamp according to the first embodiment of this invention is generally indicated at 1. The vehicle front lamp 1 comprises of a light source 2, reflector 3, and lens 4 FIG. 2.

The structure of the reflector 3 will now be described in detail. An upper first curved surface 31 is arranged at a higher position than the light source 2, and a lower first curved surface 32 is arranged at a lower position than the light source 2. The upper and lower first curved surfaces 31 and 32 reflect light from the light source 2 in the right and left directions, respectively. The upper first curved surface 31 is a composite structure of an upper right curved surface 31*a* of a paraboloid of revolution and an upper left curved surface 31*b* of a paraboloid of revolution. Similarly, the lower first curved surface 32 is a composite structure of a lower right curved surface 32*a* of a paraboloid of revolution and a lower left curved surface 32*b* of a paraboloid of revolution. At the right and left of the light source 2, there are arranged upper and lower second curved surfaces 33 and 34 respectively corresponding to the upper and lower first curved surfaces 31 and 32, for reflecting the reflected light from the first curved surfaces 31 and 32 forward by making the light substantially parallel. The upper and lower second curved surfaces 33 and 34 are made of parabolic cylinder curved surfaces. The structure of the reflector 3 described above is the same as conventional.

According to this invention, the upper right and left curved surfaces 31*a* and 31*b* shaped in the form of parabolic cylinder surfaces are slanted by an angle of 10 to 35 degrees so as to direct the reflected light beam downward. Similarly, the lower right and left curved surfaces 32*a* and 32*b* shaped in the form of parabolic cylinder surfaces are slanted by an angle of 10 to 35 degrees so as to direct the reflected light beam upward.

With the structure as described above, the reflected light from the upper and lower first curved surfaces 31 and 32 are aligned near an along a horizontal line passing through the light source 2. The upper and lower second curved surfaces 33 and 34 are disposed in contact relation to each other along the horizontal line.

According to the present invention, in order to prevent light from the light source 2 from being directly applied to the second curved surfaces 33 and 34, there are further provided right and left light shielding units 35 and 36 at the right and left of the light source 2 along the horizontal line, i.e., along the line defining the contact between the upper and lower second curved surfaces. The right and left light shielding units 35 and 36 are respectively provided with right and left third curved surfaces 35*a* and 36*a* at positions facing the light source 2, the third curved surfaces 35*a* and 36*a* being of a paraboloid of revolution with its focus set at the light source 2.

Reflected light beams from the first curved surfaces 31 and 32 propagate toward the second curved surfaces 33 and 34. A fraction of the reflected light beams, however, is directly applied to the lens without being applied to the second curved surfaces 33 or 34, because of design restrictions of the size of the second curved surfaces 33 and 34. Such light beams which are not applied to the second curved surfaces 33 or 34 propagate slantwise relative to the horizontal plane by 10 to 35 degrees, and generate dazzling light to thus hinder effective use of light.

Such light beams which are not applied to the second curved surfaces 33 or 34 are mainly generated at the center of the first curved surfaces which constitutes a light unavailable area. In view of this, according to the present invention, there are provided upper and lower fourth curved surfaces 37 and 38 at the central front side portion of each of the first curved surfaces 31 and 32, the fourth curved surfaces being of a paraboloid of revolution with a focus set at the light source 2.

The operation as well as the advantageous effects of the reflector 3 constructed as above will now be described. The operation of similar elements is not described in duplicate, but the operation of representative elements only will be given.

Figure 4:
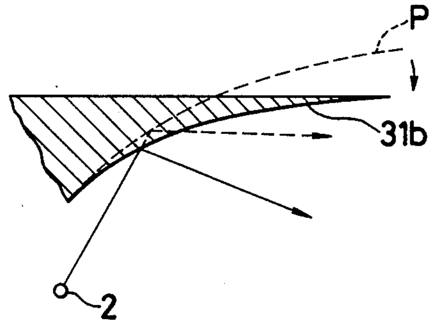
FIG. 4 is a diagram for explaining a light flux capture ratio.

Light beams from the light source 2 are reflected by the upper left parabolic cylinder curved surface 31*b* of the upper first curved surface 31. Since the upper left parabolic cylinder curved surface 31*b* is slanted downward, the effective reflection area increases as compared with a conventional one indicated by a broken line P in FIG. 4. The increased reflection area results in an increase of luminance of the front lamp, because the luminance is determined by the light flux capture ratio of the reflector under the condition of a constant light quantity of the light source 2.

Light beams reflected by the upper right parabolic cylinder curved surface 31*a* and directed slightly downward relative to the horizontal direction, are again reflected by the upper second curved surface 33 and made into substantially parallel light beams because the upper curved surface 33 is also made of a parabolic cylinder surface, as described in detail in the above-referenced Japanese Publication Nos. 61-63702 and 61-71905. The lens 4 with a predetermined lens-cut as well known in the art gives a desired light distribution characteristic.

In this invention, the light shielding unit 35 is provided along the horizontal line passing through the light source 2 in order for the light beam from the light source 2 not to be directly applied to the second curved surface 33. As a result, stray light can be eliminated completely. Further, the right third curved surface 35*a* formed on the light shielding unit 35 at the position facing the light source 2 makes light beams parallel and propagates them forward, in a similar manner as with the second curved surface 33. The lens 4 therefore can provide a desired light distribution characteristic.

The upper fourth curved surface 37 also makes light beams parallel and propagates them forward to thereby allow an adjustment of the light distribution characteristic.

Samples of the vehicle front lamp 1 and computer simulation made by the present inventor confirmed that the light flux capture ratio of the vehicle front lamp with an aperture area (170 width ×60 height) was 157.7% of a conventional lamp with the same aperture area, thus improving the luminance by about 60%.

Figure 5:
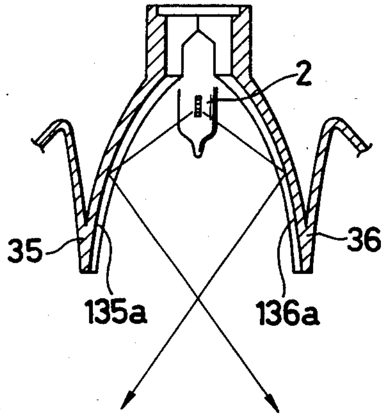
FIG. 5 is a cross section showing the main part of a second embodiment of this invention.
Figure 6:
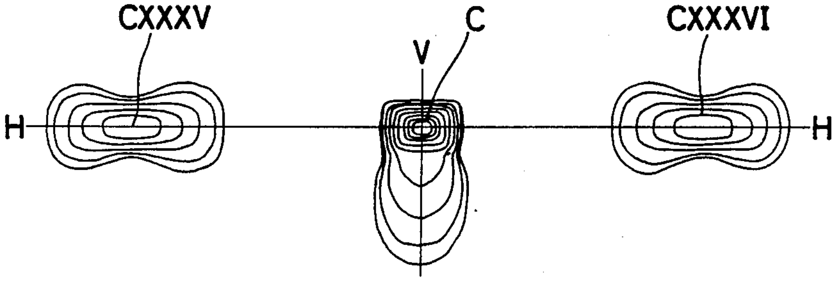
FIG. 6 shows the light distribution of the second embodiment without using a lens.

FIG. 5 shows the main part of a second embodiment of a vehicle front lamp according to the present invention. In this embodiment, the right and left third curved surfaces 135*a* and 136*a* respectively formed at the right and left light shielding units 35 and 36 are slanted so as to the light flux capture ratio, similar to the case of the upper right parabolic cylinder curved surface 31*a* for example in the first embodiment. The right and left third curved surfaces 135*a* and 136*a* are slanted inside toward the light source 2 by an angle of from 15 to 30 degrees. The light distribution characteristic of the front lamp thus constructed is shown in FIG. 6 wherein the function of the lens 4 is not included. The reflected light from the slanted right third curved surface 135*a* propagates toward the left to form a left spot CXXXVI, whereas the reflected light from the left third curved surface 136*a* propagates toward the right to form a right spot CXXXVI. These spots are formed of intersected parallel light beams reaching the positions on the horizontal line H corresponding to the slanted angles. The arrangement of curved surfaces other than the right and left third curved surfaces 135*a* and 136*a* is the same as that of the first embodiment, so that a central spot C is formed at the intersection between the horizontal line H and a vertical line V.

The advantageous effects of the second embodiment are as follows. First, the illuminance of the front lamp 1 is improved (refer to FIG. 4 for the operation principle) because a light flux capture ratio is improved by slanting inside toward the light source the right and left third curved surfaces 135*a* and 136*a*. Second, the sagging phenomenon at opposite side portions of the light distribution characteristic can be eliminated. The sagging phenomenon occurs where the lens 4 is greatly slanted backward as often seen with recent automobile design, and the parallel light beams directed only near the intersection of the horizontal and vertical lines H and V are required to be diffused relatively broadly to the degree sufficing produce a desired light distribution characteristic, by using the lens-cut formed on the lens 4. According to this embodiment, the reflected light C at the central portion is diffused to the degree that the central spot is made to be in contact with the right and left spots CXXXVI and CXXXV, so that the light diffusion performed by the lens-cut is relatively narrow and the sagging phenomenon can be eliminated.

Figure 7:
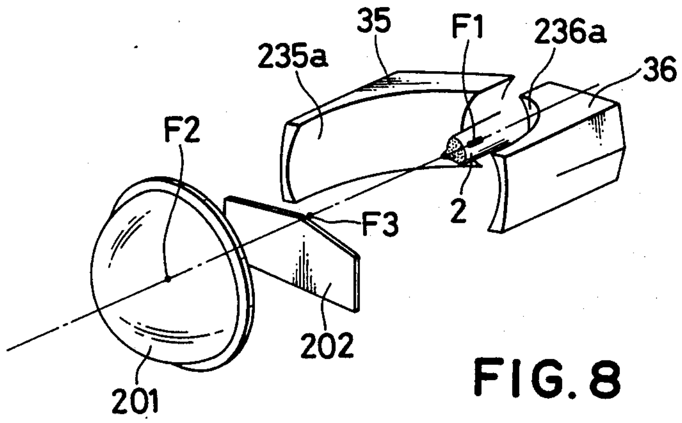
FIG. 7 is a perspective view showing the main part of a third embodiment of this invention.
Figure 8:
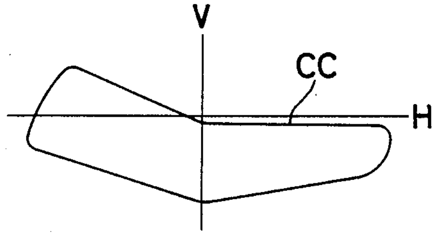
FIG. 8 shows the light distribution of the third embodiment.

FIG. 7 shows the main part of the third embodiment of the vehicle front lamp according to the present invention. In this embodiment, the right and left third curved surfaces 235*a* and 236*a* formed on the right and left light shielding units 35 and 36 are made of an ellipsoid of revolution having as a first focal point the light source 2. A convex lens 201 is mounted near the second focal point F2 of the right and left third curved surfaces 235*a* and 236*a*. A mash 202 is mounted near the focal point F3 of the convex lens 201. A projecting type front lamp is therefore constructed of the right and left third curved surfaces 235*a* and 236*a*, convex lens 201 and mask 202. The light distribution characteristic CC of the third embodiment is shown in FIG. 8. Since the mask 202 is made of opaque material so as to cover the unnecessary portion of the light distribution, the shape of this mask 202 is projected forward. As a result, for example, the light distribution called an European light distribution shown in FIG. 8 can be obtained easily, with the correct and sharp distribution along the horizontal line H. The arrangement of curved surfaces other than the right and left light shielding units 35 and 36 are the same as that of the first embodiment, so a detailed description thereof is omitted.

Figure 9:
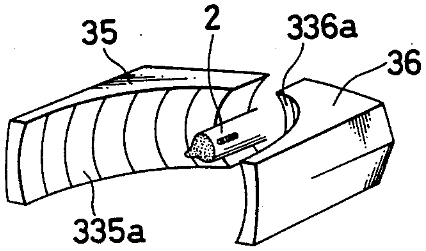
FIG. 9 is a perspective view showing the main part of a fourth embodiment of this invention.

FIG. 9 shows the main part of the fourth embodiment of the vehicle front lamp according to the present invention. In this embodiment, the right and left third curved surfaces formed on the right and left light shielding units 35 and 36 are made of a composite parabolic cylinder surface having a plurality of parabolic cylinder surfaces which have focal distances corresponding to the distance to the light source 2 and are disposed three dimensionally side by side along the inner surface of the right and left third curved surfaces without any step at intersections. Each parabolic cylinder surface is a portion of the surface obtained by cutting a paraboloid of revolution in the vertical direction at the width defined by two points on the curve obtained by cutting the paraboloid of revolution in the horizontal direction.

In operation of the fourth embodiment, the composite parabolic cylinder surface formed on the right and left light shielding units 35 and 36 at the right and left sides of the light source 2, converges light beams narrowly in the vertical direction and reflects light beams broadly in the horizontal direction. Therefore, by properly adjusting the focal distance and width of each parabolic cylinder surface, a light distribution characteristic necessary for a vehicle front lamp can be obtained as desired. This arrangement dispenses with the lens-cut of the lens 4 to be formed at the positions corresponding to the right and left third curved surfaces 335*a* and 336*a*. The sagging phenomenon as described with the second embodiment can be avoided even if a lens 4 slanted greatly backward is used. Also in this embodiment, the arrangement of the curved surfaces other than the right and left light shielding units 35 and 36 is the same as with the first embodiment, so description thereof therefor is omitted.

As described so far, according to the present invention, the first curved surfaces are slanted to improve the light flux capture ratio. The upper and lower second curved surfaces are disposed in contact relation to each other. The right and left light shielding units 35 and 36 are provided in order for the light beams from the light source not to be applied directly to the second curved surfaces. Accordingly, the arrangement of the first and second curved surfaces allows an improved light flux capture ratio and hence a high illumination vehicle front lamp, without causing stray light. The light flux capture ratio can thus be increased by 60% over a conventional one. Further, there are provided the third curved surfaces on the inside surface of the light shielding units facing the light source, to thereby reflect the light beams from the light source forward. By properly selecting the third curved surfaces, such as a paraboloid of revolution an, ellipsoid of revolution, and a composite parabolic cylinder surface, it becomes possible to realize a desired light distribution for various applications, such as for a slanted lens or the like.

While it is apparent that many modifications and variations may be implemented without departing from the scope of the novel concept of this invention, it is intended by the appended claims to cover all such modifications and variations which fall within the true spirit and scope of the invention.

I claim:

1. A vehicle front lamp, comprising:

a light source;

an upper first curved surface made of composite curved surfaces for reflecting a light beam from said light source in the left direction of the vehicle and in the right direction of the vehicle, respectively, said upper first curved surface being mounted at a higher position than said light source;

a lower first curved surface made of composite curved surfaces for reflecting a light beam from said light source in the left direction of the vehicle and in the right direction of the vehicle, respectively, said lower first curved surface being mounted at a lower position than said light source;

an upper second curved surface for reflecting a light beam reflected from said upper first curved surface for making said light beam reflected thereby substantially parallel in the forward direction of the vehicle, said upper second curved surface being formed at the right and left of said light source;

a lower second curved surface for reflecting a light beam reflected from said lower first curved surface for making said light beam reflected thereby substantially parallel in the forward direction of the vehicle, said lower second curved surface being formed at the right and left of said light source;

said composite curved surfaces of said upper first curved surface being slanted by an angle of 10 to 35 degrees so as to direct said light beam reflected thereby downward;

said composite curved surfaces of said lower first curved surface being slanted by an angle of 10 to 35 degrees so as to direct said light beam reflected thereby upward;

said upper second curved surface and said lower second curved surface being in contact relation with each other substantially along a line; and light shielding units mounted at the right and left of said light source along said line defining said contact between said upper and lower second curved surfaces.

2. The vehicle front lamp of claim 1, further comprising a third curved surface provided at a surface of said light shielding units facing said light source, said third curved surface reflecting a light beam from said light source in the forward direction of the vehicle.

3. The vehicle front lamp of claim 2, further comprising a fourth curved surface of a paraboloid of revolution provided at a central front side portion of each of said upper and lower first curved surfaces, said central front side portions each defining a light unavailable area relative to said second curved surfaces.

4. The vehicle front lamp of claim 2, further comprising a further curved surface of a paraboloid of revolution provided at a central front side portion of each of said upper and lower first curved surfaces, said central front side portions each defining a light unavailable area relative to said second curved surfaces.

5. The vehicle front lamp of claim 2, wherein said third curved surface comprises a paraboloid of revolution.

6. The vehicle front lamp of claim 3, wherein said third curved surface comprises a paraboloid of revolution.

7. The vehicle front lamp of claim 2, wherein said third curved surface comprises a paraboloid of revolution, and is slanted by an angle of 15 to 30 degrees for directing the light beam reflected thereby in a inward direction of the vehicle.

8. The vehicle front lamp of claim 3, wherein said third curved surface comprises a paraboloid of revolution, and is slanted by an angle of 15 to 30 degrees for directing the light beam reflected thereby in a inward direction of the vehicle.

9. The vehicle front lamp of claim 2, wherein said third curved surface comprises a paraboloid of revolution.

10. The vehicle front lamp of claim 2, wherein said third curved surface comprises a composite ellipsoid.

11. The vehicle front lamp of claim 2, wherein said third curved surface comprises a combination of a plurality of parabolic cylinder surfaces.

* * * * *

UNITED STATES PATENT AND TRADEMARK OFFICE
CERTIFICATE OF CORRECTION

PATENT NO. : 4,928,214

DATED : May 22, 1990

INVENTOR(S) : Hiroo OYAMA

It is certified that error appears in the above-identified patent and that said Letters Patent is hereby corrected as shown below:

Column 1, line 27, following "right and", insert --left--.

Column 2, line 61, delete "of".

Column 3, line 29, change "an" to read --and--.

Column 4, line 51, before "the light flux", insert --improve--.

Column 5, line 6, change "a" to read --the--.

Column 5, line 8, change "the" to read --a--.

Column 5,line 16, following "sufficing", insert --to--.

Signed and Sealed this

Sixth Day of July, 1993

Attest:

Michael K. Kirk

MICHAEL K. KIRK

*Attesting Officer*

*Acting Commissioner of Patents and Trademarks*